US012275128B2

(12) United States Patent
Chen

(10) Patent No.: US 12,275,128 B2
(45) Date of Patent: Apr. 15, 2025

(54) TOOL HOLDER

(71) Applicant: Jun-Fan Chen, Taichung (TW)

(72) Inventor: Jun-Fan Chen, Taichung (TW)

( * ) Notice: Subject to any disclaimer, the term of this patent is extended or adjusted under 35 U.S.C. 154(b) by 0 days.

(21) Appl. No.: 18/457,593

(22) Filed: Aug. 29, 2023

(65) Prior Publication Data

US 2025/0073889 A1 Mar. 6, 2025

(51) Int. Cl.
*B65D 85/28* (2006.01)
*B25H 3/00* (2006.01)

(52) U.S. Cl.
CPC .................................... *B25H 3/006* (2013.01)

(58) Field of Classification Search
CPC ...................................................... B25H 3/006
See application file for complete search history.

(56) References Cited

U.S. PATENT DOCUMENTS 1,006,486 A * 10/1911 King ...................... G03B 21/54 211/41.13
2,348,816 A * 5/1944 Hyams .................. A61J 9/0684 248/106
3,860,048 A * 1/1975 White ....................... B67C 9/00 D7/619.1
4,629,067 A * 12/1986 Pavlik ................ G11B 33/0433 211/41.12
D330,147 S * 10/1992 Garber ........................ D7/619.1
5,346,063 A * 9/1994 Chow ...................... B25H 3/04 206/483
D361,450 S * 8/1995 Weatherby ..................... D7/601
5,505,316 A * 4/1996 Lee .......................... B25H 3/04 211/175
5,544,747 A * 8/1996 Horn ........................ B25H 3/06 211/DIG. 1
6,315,121 B1 * 11/2001 Hansen .................... B25H 3/04 206/451
D494,421 S * 8/2004 Nanninga ...................... D7/601
6,832,744 B1 * 12/2004 Pitt ......................... A47F 10/06 248/146
7,025,312 B1 * 4/2006 Dare ....................... A47J 47/16 220/744
D626,654 S * 11/2010 Carter .......................... D24/199
D651,471 S * 1/2012 Harrington .................... D7/601
8,403,155 B1 * 3/2013 Kao ......................... B25H 3/04 211/70.6
8,807,501 B2 * 8/2014 Chung ..................... B25H 3/04 248/176.1
D807,694 S * 1/2018 Jewett ......................... D7/619.1
11,059,163 B2 * 7/2021 Steinweg ................. B25H 3/04
(Continued)

*Primary Examiner* — Amy J. Sterling

(74) *Attorney, Agent, or Firm* — Muncy, Geissler, Olds & Lowe, P.C.

(57) ABSTRACT

A tool holder is provided, including a main body. The main body includes a base and two supporting portions, and the base has a cavity disposed thereon and extending in a first direction. The two supporting portions are spacedly arranged and protrude beyond the base in the first direction, and the two supporting portions define a mouth communicated with the cavity. The base is configured for a tool to be received within the cavity along the first direction and placed thereon, and the two supporting portions are configured for the tool to be placed thereon through the mouth and the cavity. The tool can be held on the tool holder in two different ways to meet different using requirements.

9 Claims, 9 Drawing Sheets

(56) References Cited

U.S. PATENT DOCUMENTS

| | | | | | |
|---|---|---|---|---|---|
| 11,083,297 | B1 * | 8/2021 | Alonzo | A47B 97/04 | |
| D931,062 | S * | 9/2021 | Richardson | D7/619.1 | |
| D968,622 | S * | 11/2022 | Robran | D24/190 | |
| 2002/0121491 | A1 * | 9/2002 | Ernst | B25H 3/04 | 206/372 |
| 2007/0141885 | A1 * | 6/2007 | Chen | B25H 3/04 | 439/266 |
| 2015/0144744 | A1 * | 5/2015 | Holtby | F16L 3/02 | 248/49 |
| 2019/0061139 | A1 * | 2/2019 | Kao | B65D 25/101 | |

* cited by examiner

TOOL HOLDER

BACKGROUND OF THE INVENTION

Field of the Invention

The present invention relates to a tool holder.

Description of the Prior Art

During the assembly/disassembly process of objects or products, it is usually necessary to use specific assembly/disassembly tools in order to reliably connect many parts or disassemble without damaging the objects or products. It is common to use hand tools to drive members, such as wrenches, pliers, mallets, sockets or scissors screws, bolts, pins or the like, to connect parts s of connecting parts.

There are various types and various sizes of connectors, and there are therefore a variety of hand tools needed to cooperate with the various connectors. Generally, hand tools are placed in drawers, trolleys or other storage spaces. However, there is no positioning structure in the storage space such that the hand tools are stacked and placed randomly, making it difficult for users to find the required hand tools, and the hand tools jam, interfere, and collide with each other, causing unnecessary damage to the hand tools.

The present invention is, therefore, arisen to obviate or at least mitigate the above-mentioned disadvantages.

SUMMARY OF THE INVENTION

The main object of the present invention is to provide a tool holder, which can stably hold a tool in two ways and store the tool neatly.

To achieve the above and other objects, the present invention provides a tool holder, including: a main body. The main body includes a base and two supporting portions, and the base has a cavity disposed thereon and extending in a first direction. The two supporting portions are spacedly arranged and protrude beyond the base in the first direction, and the two supporting portions define a mouth communicated with the cavity. The base is configured for a tool to be received within the cavity along the first direction and placed thereon, and the two supporting portions are configured for the tool to be placed thereon through the mouth and the cavity.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
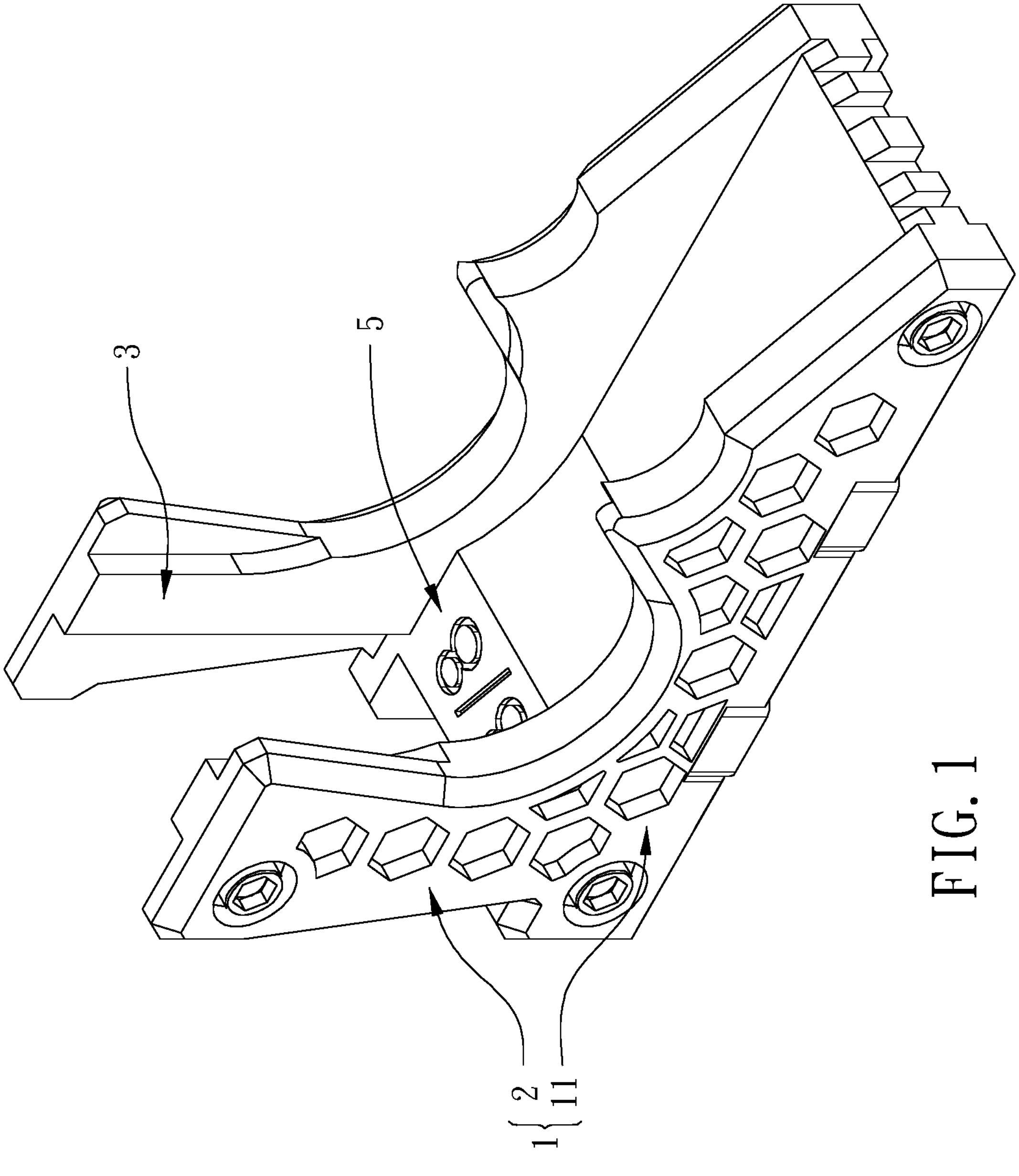
FIG. 1 is a stereogram of a preferable embodiment of the present invention.
Figure 2:
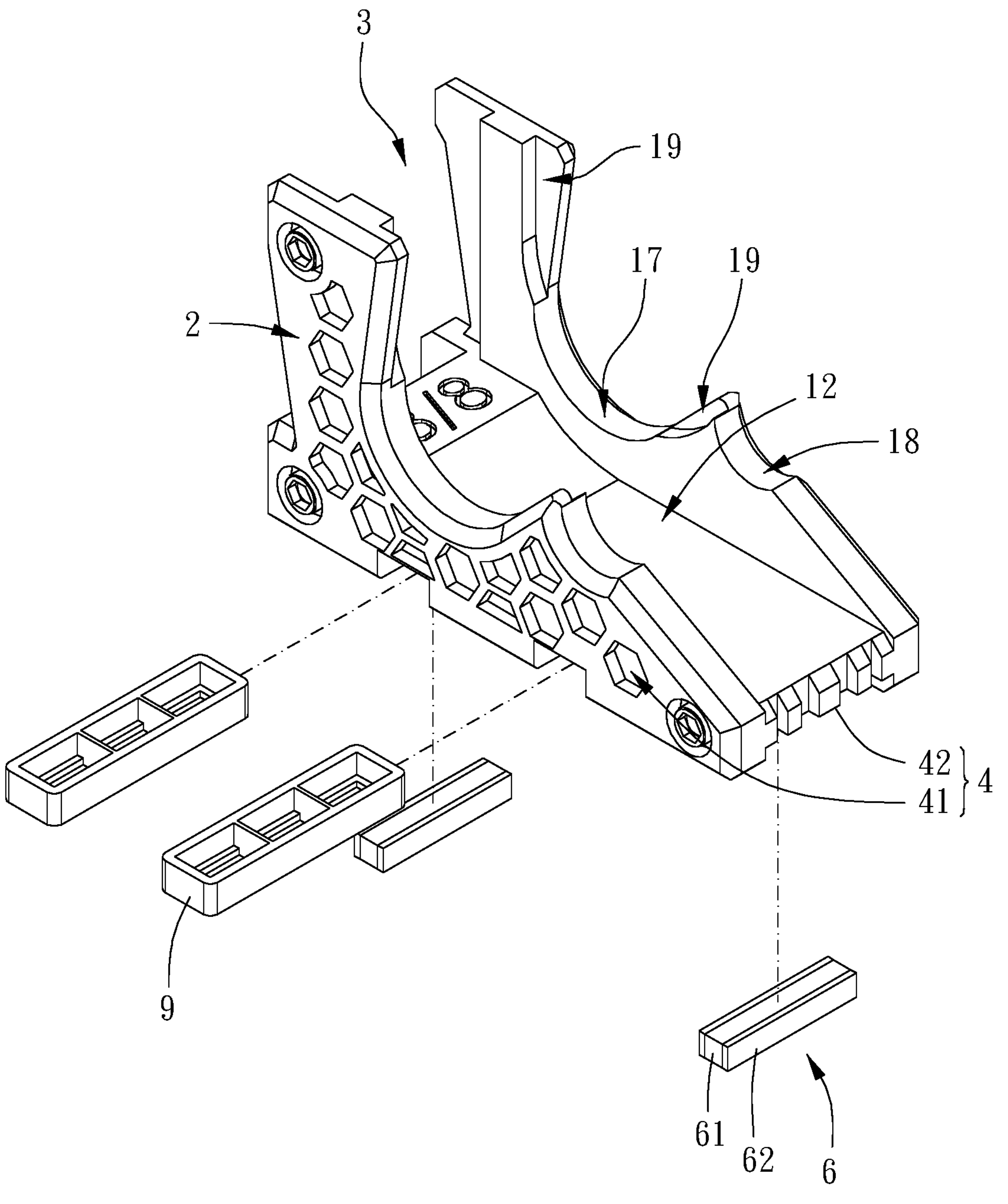
FIG. 2 is a breakdown drawing of a preferable embodiment of the present invention.
Figure 3:
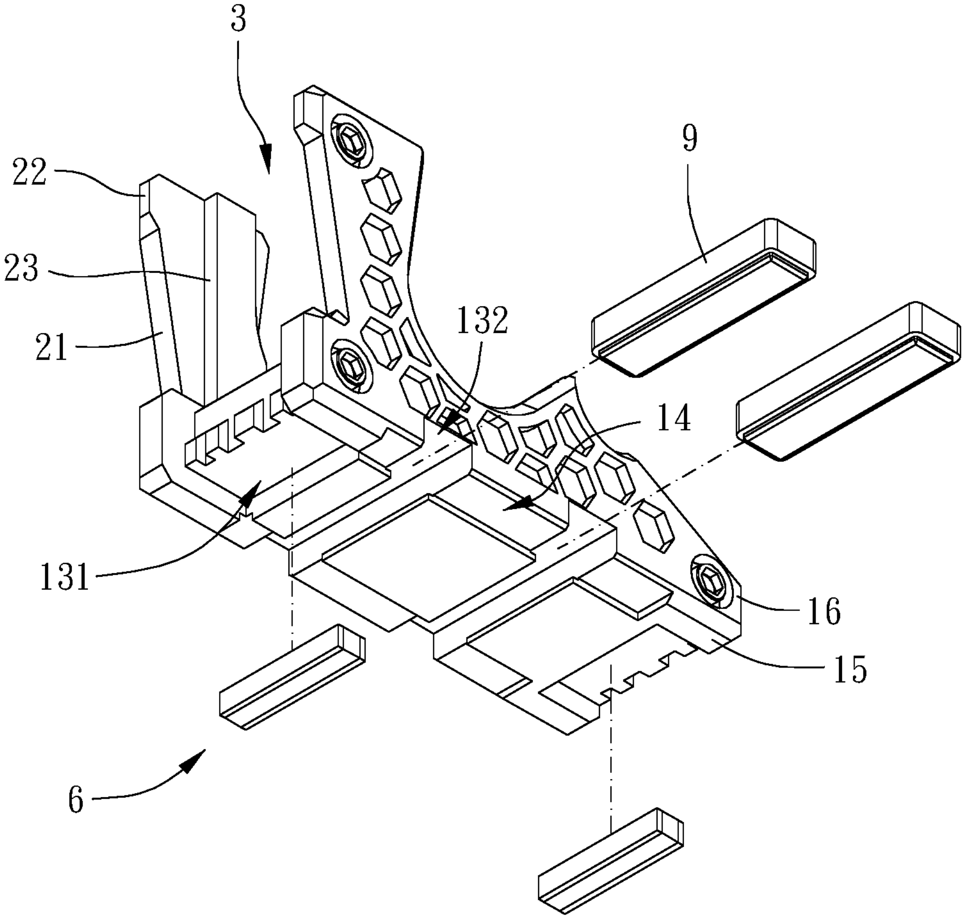
FIG. 3 is a breakdown drawing of a preferable embodiment of the present invention as viewed in another perspective.
Figure 4:
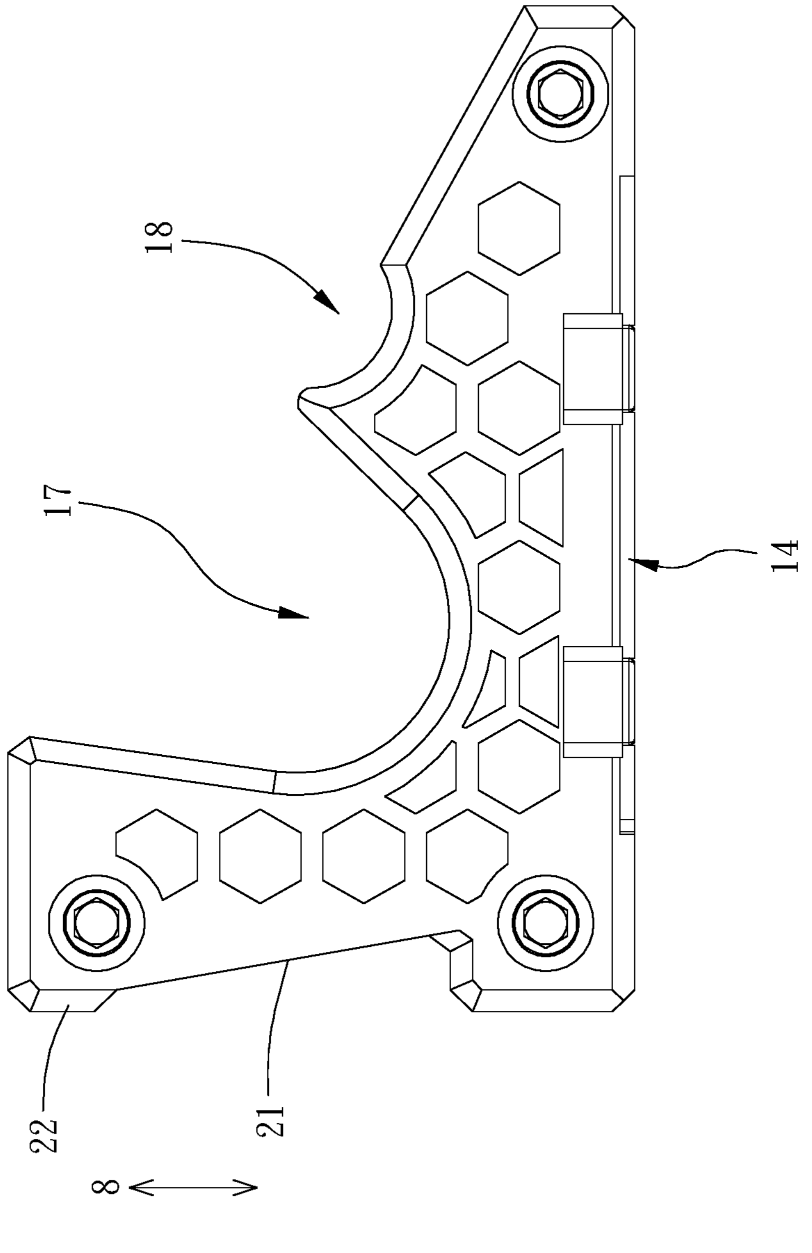
FIG. 4 is a side view of a preferable embodiment of the present invention.
Figure 5:
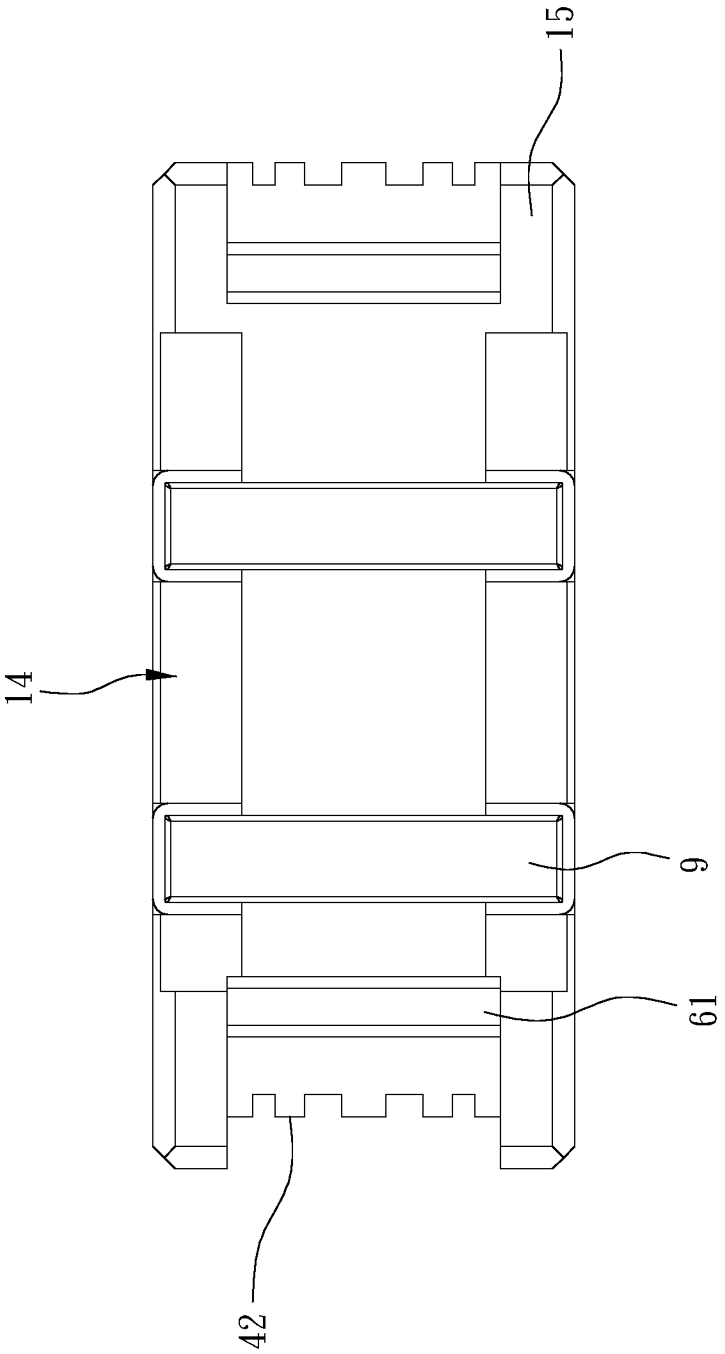
FIG. 5 is a bottom view of a preferable embodiment of the present invention.
Figure 6:
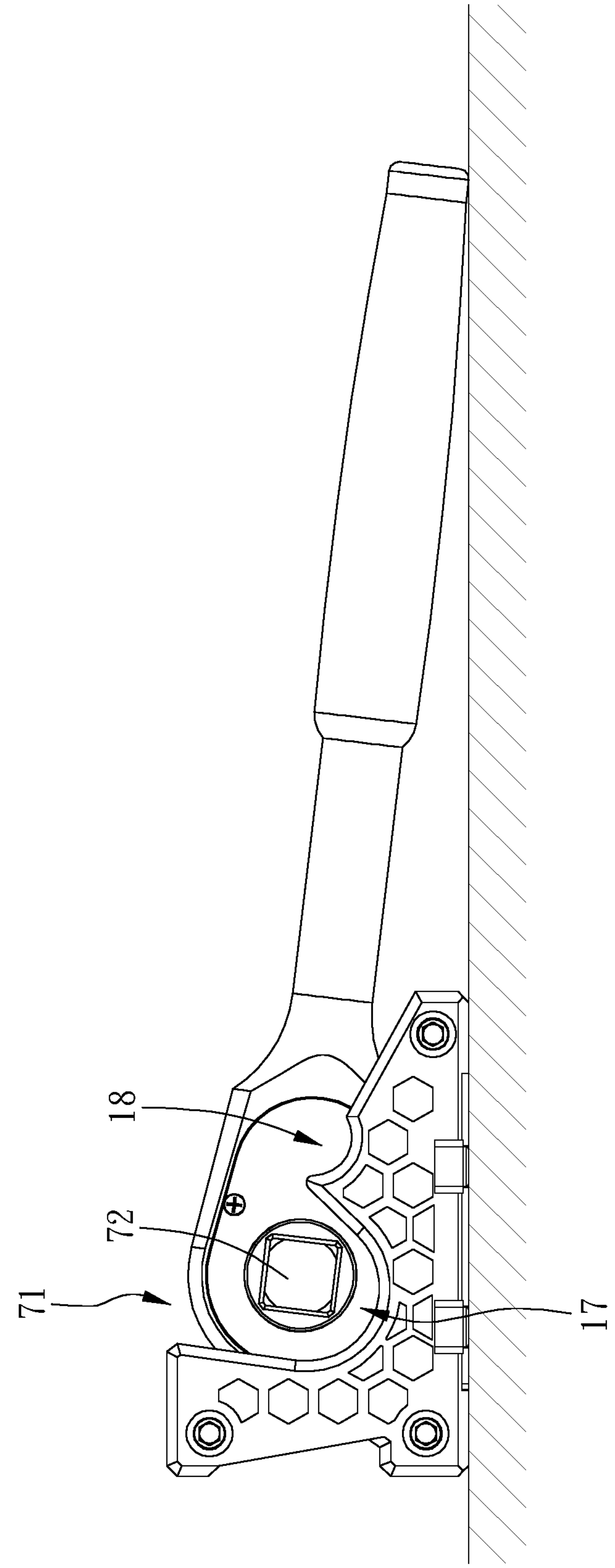
FIG. 6 is a schematic diagram of a preferable embodiment of the present invention in use.
Figure 7:
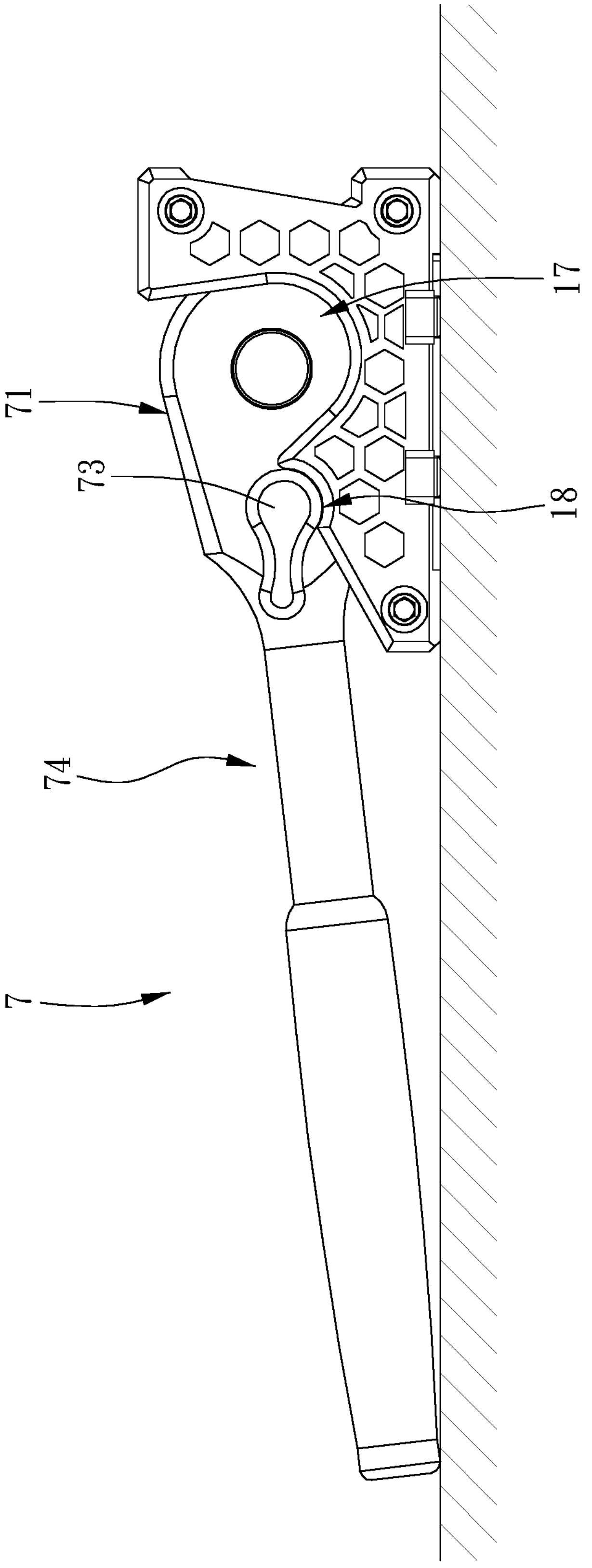
FIG. 7 is a schematic diagram of FIG. 6 as viewed from another perspective.
Figure 8:
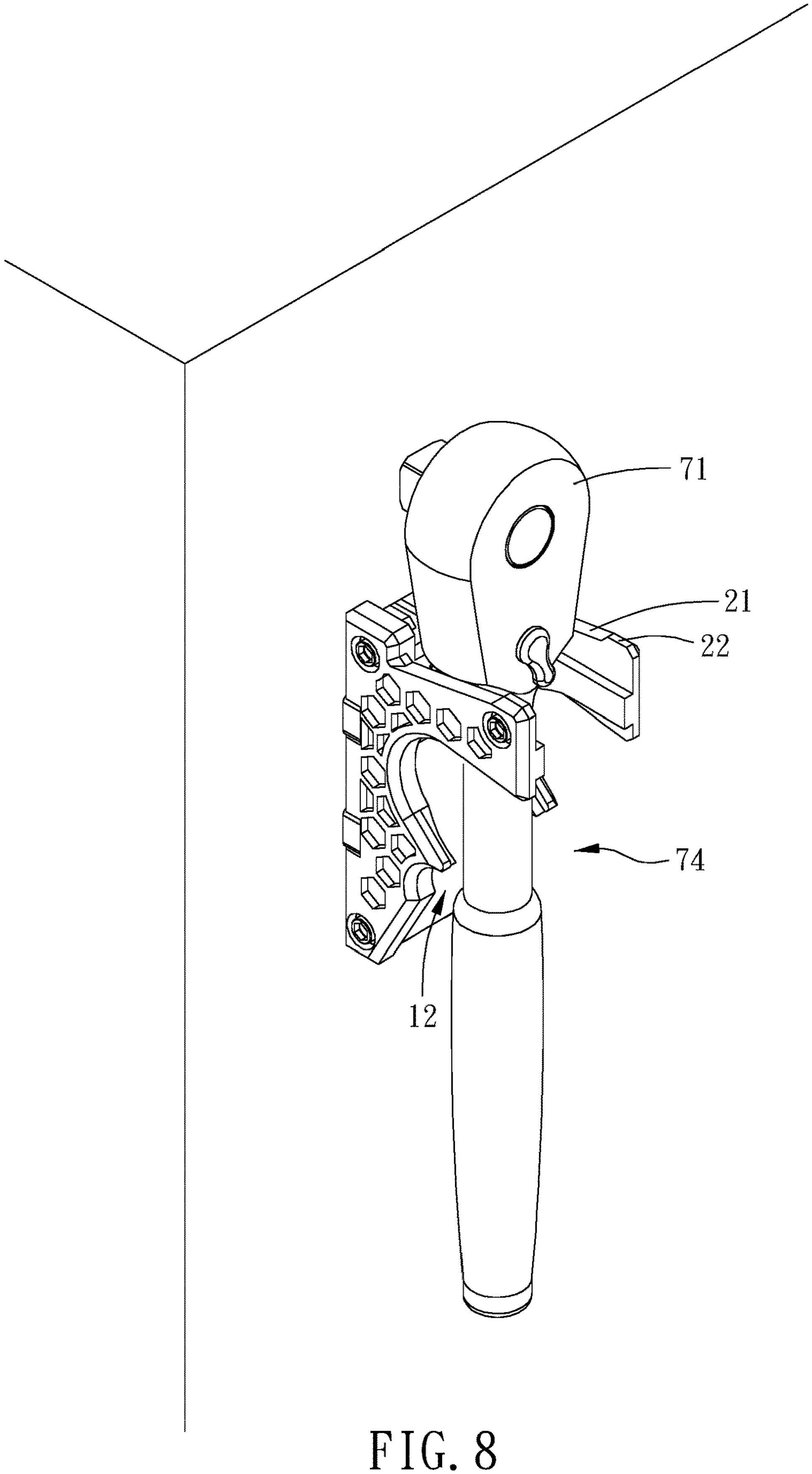
FIG. 8 is a schematic diagram of a preferable embodiment of the present invention used in another way.
Figure 9:
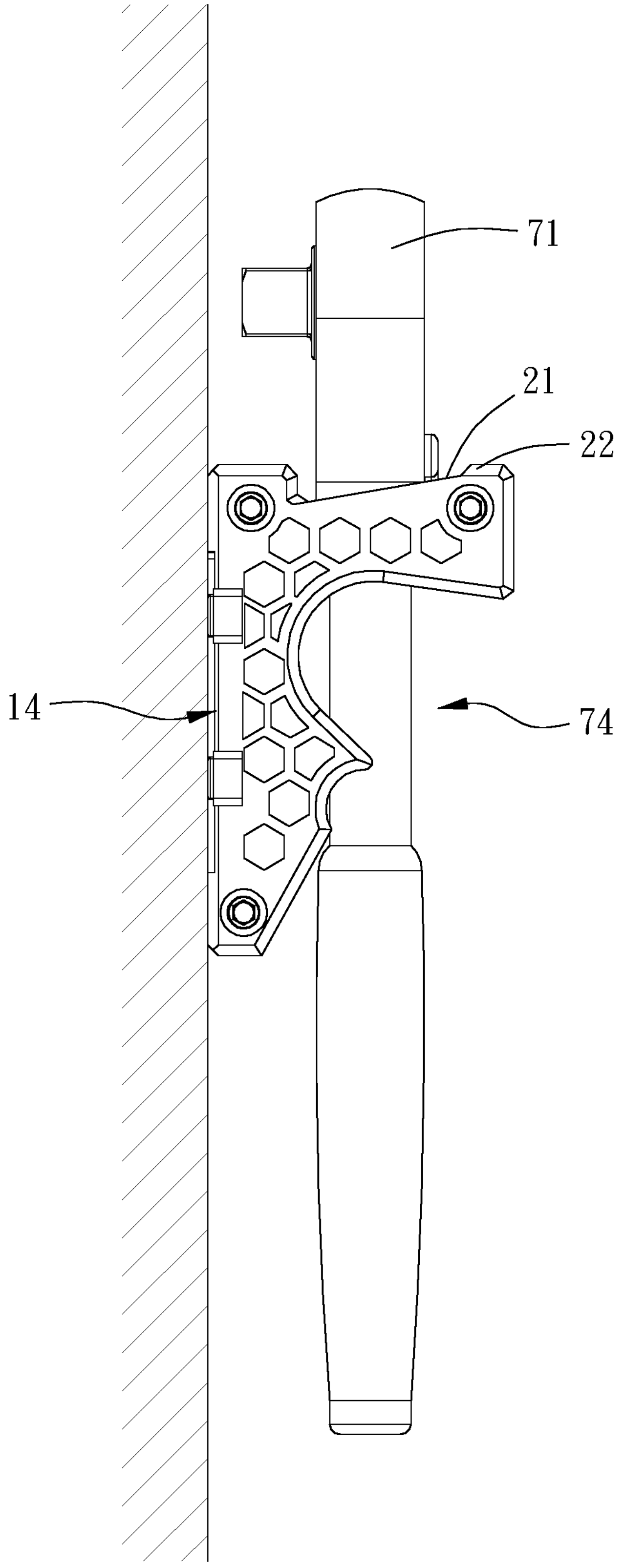
FIG. 9 is a schematic diagram of FIG. 8 as viewed from another perspective.

Please refer to FIGS. 1 to 9 for a preferable embodiment of the present invention. A tool holder of the present invention includes a main body 1.

The main body 1 includes a base 11 and two supporting portions 2, and the base 11 has a cavity 12 disposed thereon and extending in a first direction 8. The two supporting portions 2 are spacedly arranged and protrude beyond the base 11 in the first direction 8, and the two supporting portions 2 defines a mouth 3 communicated with the cavity 12. The tool holder can be used in different ways to meet the requirements of use. For example, when the first direction 8 is parallel to a direction of gravity, the base 11 is configured for a tool 7 to be received within the cavity 12 along the first direction 8 and placed thereon so as to support and restrict the tool 7. When the first direction 8 is lateral to the direction of gravity, the two supporting portions 2 are configured for the tool 7 to be placed thereon through the mouth 3 and the cavity 12 so as to hang the tool 7 on the two supporting portions 2.

Each of the two supporting portions 2 includes a supporting surface 21 located at a side of one of the two supporting portions 2 remote from the cavity 12, and each said supporting surface 21 is configured for the tool 7 to be abutted against thereon when the tool 7 is disposed through the mouth 3 and placed on the main body 1 for support.

Preferably, in the first direction 8, a side of each said supporting surface 21 remote from the base 11 is higher than a side of one said supporting surface 21 close to the base 11 so that the tool 7 placed thereon has a tendency to move in a direction toward the base 11, which effectively prevents the tool 7 from falling off. In this embodiment, each said supporting surface 21 extends continuously and obliquely so that the tool 7 can be abutted against and smoothly slid along said supporting surfaces 21.

Moreover, each of the two supporting portions 2 further includes a blocking member 22 protrudingly disposed on a side of one said supporting surface 21 remote from the base 11, and said blocking members 22 are configured to be blocked with the tool 7 in the first direction 8. The said blocking members 22 can prevent the tool 7 from falling off. In other embodiments, a blocking portion extending laterally may be disposed between the two supporting portions, and the blocking portion is configured to block the tool in the first direction to avoid detachment.

Sides of the two supporting portions 2 facing each other include a stepped surface 23 respectively, and said stepped surfaces 23 and the said supporting surfaces 21 face the same side. Each said stepped surface 23 protrudes beyond one said supporting surface 21 in a direction vertical to the first direction 8, and the said stepped surfaces 23 are configured to be abutted against the tool 7 so that the tool holder can hold one of the tools 7 of different sizes or shapes to have a wide range of applications.

The tool holder further includes at least one magnetic unit 6, and the at least one magnetic unit 6 is positioned on the base 11. The at least one magnetic unit 6 allows the tool holder to be quickly positioned on a magnetic attracted object, such as iron. In this embodiment, a side of the main body 1 opposite to the cavity 12 has at least one first receiving space 131 recessed thereon, and the at least one magnetic unit 6 is received within the at least one first receiving space 131, which effectively prevents the at least one magnetic unit 6 from being unexpectedly collided.

Specifically, the base 11 includes a bottom wall 15 and two side walls 16, and the two side walls 16 laterally protrude from the bottom wall 15. A number of the at least one first receiving space 131 is two, and a number of the at least one magnetic unit 6 is two. Two said first receiving spaces 131 and the cavity 12 are respectively disposed on two opposite sides of the bottom wall 15, and two said magnetic units 6 are received within the two said first receiving spaces 131. Each of the two said magnetic units 6 includes a magnet 61 and two iron members 62, and the magnet 61 is disposed between the two iron members 62. Furthermore, two opposite sides of the base 11 in a direction lateral to the first direction 8 respectively have a notch 14, and each said notch 14 extends from one of the two side walls 16 to the bottom wall 15. When the bottom wall 15 is mounted on an object, said notches 14 allows a user's finger to protrude therewithin to take the main body 1.

In this embodiment, the tool 7 is a ratchet wrench and includes a head portion 71 and a body portion 74 connected with each other, and the head portion 71 is received within the cavity 12 or abutted against the two supporting portions 2. Each of the two side walls 16 includes a major arcuate hole 17 and a minor arcuate hole 18 arranged in an opening direction of the mouth 3, and an opening direction of the major arcuate hole 17 is lateral to the opening direction of the mouth 3. A size of the major arcuate hole 17 is larger than a size of the minor arcuate hole 18. When the head portion 71 is received within the cavity 12, said major arcuate holes 17 are configured for a column 72 of the head portion 71 to be disposed therethrough, and said minor arcuate holes 18 are configured for a knob 73 of the head portion 71 to be received therewithin.

Each of the two side walls 16 further includes two dodge holes 19 disposed on two opposite sides of one said major arcuate hole 17, and the two dodge holes 19 are communicated with the said major arcuate hole 17, which provides a large receiving space to receive one of different types of the head portions 71.

Preferably, the tool holder further includes a concave-convex structure 4, and the concave-convex structure 4 is disposed on an outside of the main body 1 so as to increase a contact area with the user's hand for stable grip. In this embodiment, the concave-convex structure 4 includes a plurality of concave holes 41 and a plurality of ribs 42, the plurality of concave holes 41 are disposed on the two side walls 16 and the two supporting portions 2, and the plurality of ribs 42 are disposed on the bottom wall 15.

The main body 1 further includes at least one anti-slip member 9, and the at least one anti-slip member 9 may be made of rubber. A side of the main body 1 opposite to the cavity 12 has at least one second receiving space 132 recessed thereon, and the at least one anti-slip member 9 is received within the at least one second receiving space 132. The at least one anti-slip member 9 provides large frictional resistance to effectively prevent the tool holder from unexpectedly sliding.

The tool holder further includes a size indicating unit 5, and the size indicating unit 5 is disposed on the main body 1, which is convenience for the user to know a size of the tool 7.

Although particular embodiments of the invention have been described in detail for purposes of illustration, various modifications and enhancements May be made without departing from the spirit and scope of the invention. Accordingly, the invention is not to be limited except as by the appended claims.

What is claimed is:

1. A tool holder, including:

a main body, including a base and two supporting portions, the base having a cavity disposed thereon and extending in a first direction, the two supporting portions spacedly arranged and protruding beyond the base in the first direction, the two supporting portions defining a mouth communicated with the cavity;

wherein the base is configured for a tool to be received within the cavity along the first direction and placed thereon;

wherein the two supporting portions are configured for the tool to be placed thereon through the mouth and the cavity;

wherein each of the two supporting portions includes a supporting surface located at a side of one of the two supporting portions remote from the cavity, and each said supporting surface is configured for the tool to be abutted against thereon when the tool is disposed through the mouth and placed on the main body;

wherein the tool is a ratchet wrench, the tool includes a head portion and a body portion connected with each other, the head portion is received within the cavity or abutted against the two supporting portions.

2. The tool holder of claim 1, wherein in the first direction, a side of each said supporting surface remote from the base is higher than a side of one said supporting surface close to the base.

3. The tool holder of claim 1, wherein each of the two supporting portions further includes a blocking member protrudingly disposed on a side of one said supporting surface remote from the base, and each said blocking member is configured to be blocked with the tool in the first direction.

4. The tool holder of claim 1, further including a concave-convex structure, wherein the concave-convex structure is disposed on an outside of the main body.

5. The tool holder of claim 1, further including at least one magnetic unit, wherein the at least one magnetic unit is positioned on the base.

6. The tool holder of claim 5, wherein a side of the main body opposite to the cavity has at least one first receiving space recessed thereon, and the at least one magnetic unit is received within the at least one first receiving space.

7. The tool holder of claim 1, wherein the main body further includes at least one anti-slip member, a side of the main body opposite to the cavity has at least one second receiving space recessed thereon, and the at least one anti-slip member is received within the at least one second receiving space.

8. The tool holder of claim 1, further including a size indicating unit, wherein the size indicating unit is disposed on the main body.

9. The tool holder of claim 6, wherein in the first direction, a side of each said supporting surface remote from the base is higher than a side of one said supporting surface close to the base; each said supporting surface extends continuously and obliquely; each of the two supporting portions further includes a blocking member protrudingly disposed on a side of one said supporting surface remote from the base, and each said blocking member is configured to be blocked with the tool in the first direction; the tool holder further includes a concave-convex structure and a size indicating unit, the concave-convex structure is disposed on an outside of the main body, the size indicating unit is disposed on the main body; the main body further includes at least one anti-slip member, a side of the main body opposite to the cavity has at least one second receiving space recessed thereon, and the at least one anti-slip member is received within the at least one second receiving space; two opposite sides of the base in a direction lateral to the first direction respectively have a notch, the base includes a bottom wall and two side walls, the two side walls laterally protrude from the bottom wall, each said notch extends from one of the two side walls to the bottom wall; a number of the at least one first receiving space is two, a number of the at least one magnetic unit is two, two said first receiving spaces and the cavity are respectively disposed on two opposite sides of the bottom wall; the concave-convex structure includes a plurality of concave holes and a plurality of ribs, the plurality of concave holes are disposed on the two side walls and the two supporting portions, the plurality of ribs are disposed on the bottom wall; each of the two side walls includes a major arcuate hole and a minor arcuate hole arranged in an opening direction of the mouth, an opening direction of the major arcuate hole is lateral to the opening direction of the mouth, a size of the major arcuate hole is larger than a size of the minor arcuate hole; each of the two side walls further includes two dodge holes disposed on two opposite sides of one said major arcuate hole, and the two dodge holes are communicated with the said major arcuate hole; said major arcuate holes are configured for a column of the head portion to be disposed therethrough, said minor arcuate holes are configured for a knob of the head portion to be received therewithin; sides of the two supporting portions facing each other include a stepped surface respectively, said stepped surfaces and said supporting surfaces face the same side, and each said stepped surface protrudes beyond one said supporting surface in a direction vertical to the first direction; each said magnetic unit includes a magnet and two iron members, the magnet is disposed between the two iron members; and the at least one anti-slip member is made of rubber.

* * * * *